United States Patent
Prestia

(10) Patent No.: US 6,788,824 B1
(45) Date of Patent: Sep. 7, 2004

(54) CREATING IMAGE-SHARPENING PROFILES

(75) Inventor: Louis T. Prestia, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 610 days.

(21) Appl. No.: 09/675,297

(22) Filed: Sep. 29, 2000

(51) Int. Cl.$^7$ .............................. G06K 9/40; G06K 9/36
(52) U.S. Cl. ...................................... 382/263; 382/232
(58) Field of Search ................................ 382/232, 254, 382/263, 264, 266, 255, 299, 305; 345/660; 341/50

(56) References Cited

U.S. PATENT DOCUMENTS

| | | | | |
|---|---|---|---|---|
| 5,524,162 A | * | 6/1996 | Levien ........................ | 382/263 |
| 5,768,482 A | * | 6/1998 | Winter et al. ................ | 358/1.9 |
| 5,867,606 A | * | 2/1999 | Tretter ........................ | 382/261 |
| 6,005,983 A | * | 12/1999 | Anderson et al. ............ | 382/254 |
| 6,091,861 A | * | 7/2000 | Keyes et al. ................ | 382/299 |
| 6,151,415 A | * | 11/2000 | Acharya et al. ............ | 382/255 |
| 6,407,747 B1 | * | 6/2002 | Chui et al. .................. | 345/660 |
| 6,411,305 B1 | * | 6/2002 | Chui .......................... | 345/660 |
| 6,526,179 B2 | * | 2/2003 | Goldstein et al. ........... | 382/254 |
| 6,614,474 B1 | * | 9/2003 | Malkin et al. .............. | 348/252 |

\* cited by examiner

Primary Examiner—Andrew W. Johns
Assistant Examiner—Amir Alavi
(74) Attorney, Agent, or Firm—Fish & Richardson P.C.

(57) ABSTRACT

Methods and apparatus implementing image-sharpening profiles. In one aspect, the invention provides a method that includes creating an image-sharpening profile and storing the image-sharpening profile as a separate file external to any electronic image. An image-sharpening profile includes digital data encoding sharpening parameters. Sharpening parameters are control parameters for guiding the operation of an image-sharpening engine to provide a desired sharpening of an image.

33 Claims, 3 Drawing Sheets

CREATING IMAGE-SHARPENING PROFILES

BACKGROUND

This invention relates to controlling image sharpening of digital electronic images.

Processes such scanning, printing, and resampling often introduce blurring of electronic images. Sharpening engines are computer programs (or program modules) that can be used to correct such blurring. For example, unsharp masking is a conventional sharpening technique that is widely implemented in graphics programs as a tool that a user can select and apply to sharpen edges in a blurred image. Typically, an unsharp masking filter operates by locating a pixel that differs from surrounding pixels by a specific threshold (i.e., an edge pixel), increasing the brightness when the edge pixel is on the lighter side of the edge, and decreasing the brightness when the edge pixel is on the darker side of the edge. The brightened edge pixels on the lighter side of an edge form a bright line along the edge and are typically called the "white line." Similarly, the darkened edge pixels on the darker side of an edge form a dark line along the edge and are typically called the "black line." Generally, these lines are collectively referred to as "contrast lines."

With unsharp masking, the sharpening engine typically relies on three sharpening parameters to specify how an image is to be sharpened: the radius, the threshold, and the amount of sharpening. The radius specifies the width of the white and black lines. In principle, the radius can be represented in terms of pixels or in terms of a measured area, in which latter case the value is resolution independent. A low radius value produces narrow contrast lines, while a high value produces wide contrast lines. The threshold indicates the amount of difference required for an edge to be recognized between any two pixels. A low threshold value would cause a larger portion of the pixels of an image to be modified by sharpening than would a higher threshold value. The third sharpening parameter, the amount sharpen, determines the percent by which sharpening increases the contrast between pixels that have been selected for sharpening.

The proper operation of a sharpening process may depend on the resolution of the image being sharpened. Generally, sharpening parameters are set with reference to a particular output size, and therefore resolution, of an image. For example, if a 400×400 pixel image of a balloon is sharpened for printing to an 7×10 inch area, but actually printed to 3.5×5 inch area, contrast lines would form an undesirable halo around the edge of the balloon.

The proper operation of a sharpening process may also depend on matching the process parameters to a particular output device. Generally, for a given image, different output device types will not produce exactly the same output. For example, continuous tone and halftone printers will produce renditions of the same image that look different. Thus, sharpening an image for printing from one type of printer will not necessarily produce the correct level of sharpened image appearance on another output device.

SUMMARY

The invention provides methods, and apparatus including computer program products, implementing and using image sharpening profiles.

In general, in one aspect, the invention provides a method for specifying an image processing operation. The method includes creating an image-sharpening profile and storing the image-sharpening profile as a separate file external to any electronic image. An image-sharpening profile includes digital data encoding sharpening parameters. Sharpening parameters are control parameters for guiding the operation of an image-sharpening engine to provide a desired sharpening of an image. The profile can be designed for a particular resolution, rendering device, or subject matter and applied to any number of images for which the profile is designed. The file in which the profile is stored can be any separately addressable collection of related data, whether stored locally or remotely from the process that creates the profile or any image with which the profile may be associated. The electronic images to which sharpening is applied by computer programs are digital images; however, source images can be analog as well as digital images recorded in electronic form. Some common examples of electronic images are facsimiles, images displayed on a raster device, images produced by a digital camera, and images printed from a printer.

The invention can be implemented to realize one or more of the following advantages. When setting sharpening parameters, creators or editors of electronic images need not commit to a particular output size or rendering device because the sharpening parameters are not permanently applied to the electronic images but rather saved to an image-sharpening profile, a file external to the electronic image. Users at the end of the workflow have the flexibility of applying different sharpening parameters to the electronic images rather than use the sharpening parameters the image creator established. Sharpening adjustment at the end of the workflow can be applied to the original electronic image rather than applied on top of an electronic image already sharpened by its creator. Additionally, users at the end of the workflow do not require expensive image manipulation applications to create new or edit existing image-sharpening profiles. With respect to this advantage, users at the end of the workflow have great flexibility and can either create image-sharpening profiles from a stand-alone image application for creating image-sharpening profiles, or use previously created, generic image-sharpening profiles. Alternative, they can start with a generic image-sharpening profile and adjust this profile according to their requirements. Another advantage is that the image-sharpening profiles may be applied using different sharpening engines. Consequently, users at the end of the workflow do not need the sharpening engine used to preview the effects of the profile when the profile was created. Thus, the manufacturer of a particular workflow component may advantageously choose to license different engines to differentiate or cost-reduce its product.

The details of one or more embodiments of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

Figure 1:
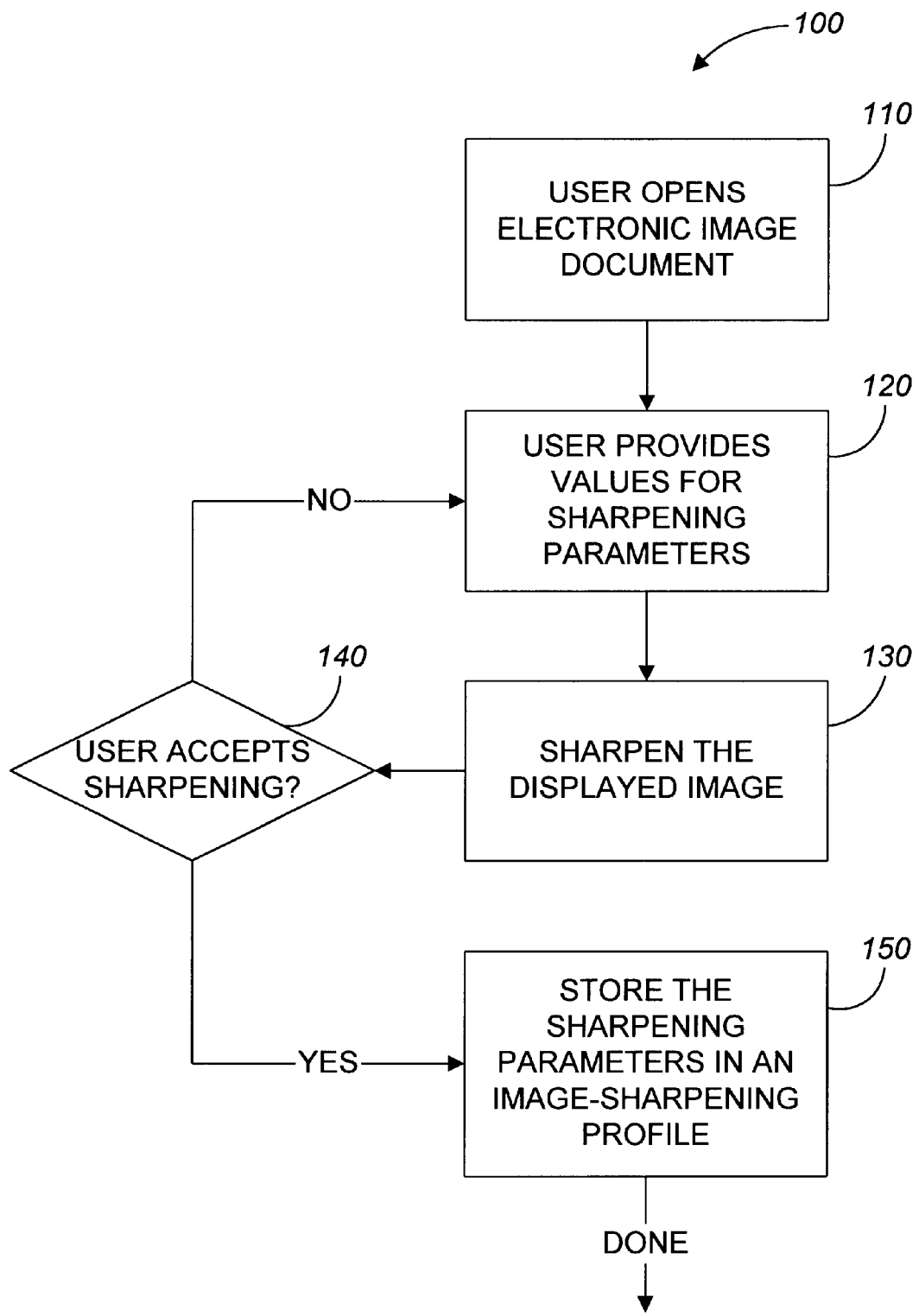
FIG. 1 is a flowchart of a method for creating an image-sharpening profile in accordance with the invention.

FIG. 1 is a flowchart of a method 100 for creating an image-sharpening profile, which will be described as implemented in a computer graphics application program. A user of the application opens and displays a representative sample of an image (step 110). The user selects a feature for creating image-sharpening profiles and provides sharpening parameters (step 120). These can be provided through any form of graphic or text based user interface. The parameters can include the radius, threshold, amount sharpen, black-line enable, and white-line enable parameters described above. Additional sharpening parameters can include an original image size and resolution and a smoothing enable.

The original size and resolution are the size and resolution of the sample image at the time the sharpening parameters are established. In this case, they are the current size and resolution of the image opened in step 110. This parameter allows a sharpening engine to proportionally adjust the amount sharpen. Thus, a sharpening engine can perform the proper level of sharpening independent of output size or resolution.

Smoothing enable activates a feature that automatically removes sharpening from an image that has had all of its edge pixels sharpened. Smoothing is essentially the inverse of sharpening and works similarly to sharpening except that instead of increasing the amount sharpen and adding contrast lines, smoothing decreases amount sharpen and removes contrast lines. This feature is used with a specific type of sharpening engine. In this implementation, the engine first sharpens all edges in a sample image. Then, it selectively smoothes the sample image.

Next, the user causes the application to sharpen a preview of the sample image as specified by the sharpening parameters (step 130). The user previews the sharpened preview sample image. If the sharpened sample image is not satisfactory to the user ("no" branch from decision step 140), the user provides different sharpening parameters (i.e., repeats step 120). The user iteratively provides sharpening parameters and evaluates the sample image preview until the user is satisfied.

The user can accept the sharpening parameters ("yes" branch from decision step 140) by indicating to the application that it should store the sharpening parameters as an image-sharpening profile (step 150). The profile is stored in a profile file that is external to any electronic file containing the image.

The profile can be stored in a self-describing XML format. A sharpening engine receiving a profile in this format can recognize, select and use the parameters it needs.

Figure 2:
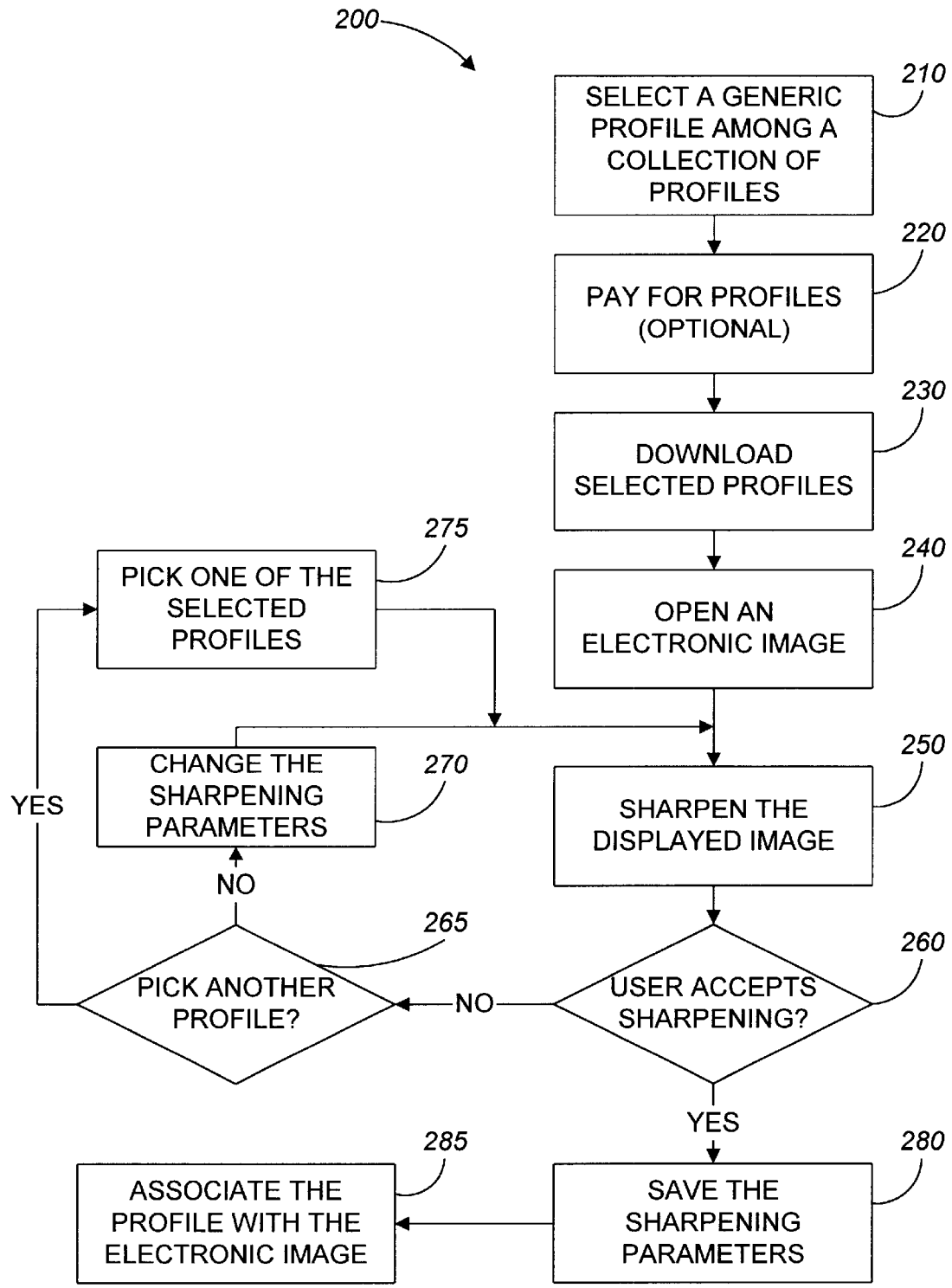
FIG. 2 is a flowchart of another method for creating an image-sharpening profile.

FIG. 2 is a flowchart of a method 200 that involves using an image-sharpening profile from a collection of generic image-sharpening profiles. Generic profiles are designed to provide a generally appropriate level of sharpening for certain types of subject matter, such as people (which can be expected to have prominent flesh tones), commercial products (such as watches and toys), natural landscapes, and urban landscapes; or for certain types of images, such as professionally photographed images, amateur photographs, images containing type, images containing angular lines, images with s particular level of contrast such as high, normal, or low contrast, and images with specific tonal distributions such as images with mainly light tones, mainly dark tones, or mainly middle tones. As an example, a generic image-sharpening profile for an electronic image of commercial products has a 225 amount sharpen value, a radius value of 2 pixels, and a threshold of 12 counts while an electronic image of a portrait has a 190 amount sharpen value, a radius value of 1.8 pixels, and a threshold of 20 counts.

In this method 200, the user selects a profile from a collection of generic image-sharpening profiles (step 210). The collection can be a library of profiles stored locally or on a server coupled to the user's computer by a local area network or a wide area network such as the Internet. The user should select an image-sharpening profile appropriate for the electronic image the user intends to sharpen. If the collection were a commercial one, the user would pay for the selected profile or profiles (step 220). The user selects from the database of available image-sharpening profiles (either local or remote) or may choose to download one or more preferred remote image-sharpening profile (step 230). The user displays a sample of an image with a graphics program (step 240). The program can be a simple viewer with minimal editing tools or it can be a fully-functional graphics application. The user picks a profile (if more than one was selected) (step 275) and applies it to sharpen a copy of the sample image to produce a preview image with a sharpening engine that is part of, or invoked by, the program (step 250). The user evaluates the preview image (step 260). If the preview image is not satisfactory to the user, the user adjusts the sharpening parameters in the generic image-sharpening profile (step 270) or picks a different one of the previously-selected profiles (step 275) according to an optional user input (decision step 265) and the availability of multiple previously-selected profiles.

When the user is satisfied with the sharpened preview appearance of the sample image, if the user has adjusted the parameters of a profile, the user can store the sharpening parameters as a new image-sharpening profile (step 280) and, optionally, associate the new profile with the image (step 285). If the user has found a satisfactory generic profile, the user can associate that profile with the image (step 285).

An image-sharpening profile can be associated with a particular image in a variety of ways. For example, a tag can be added to a file containing the image, where the tag contains a name or pointer of some kind, such as a URL (Uniform Resource Locator) or a URI (Uniform Resource Identifier), that can be used to find the profile file later. The tagging can be implemented in any program that can modify the image and receive a reference to the profile, such as through a drag-and-drop editor or a file system browser or otherwise.

A first user can provide an image and its associated image-sharpening profile to a second user, who advantageously requires only a viewer with a sharpening engine instead of a complete graphics application to view the image with the sharpening intended by the first user. In addition, the second user can adjust the sharpening parameters of the associated image-sharpening profile for the particular output devices being used by the second user. Furthermore, the second user can sharpen the image use his or her own sharpening parameters without loss of quality because the first user has not modified the image to sharpen it.

Figure 3:
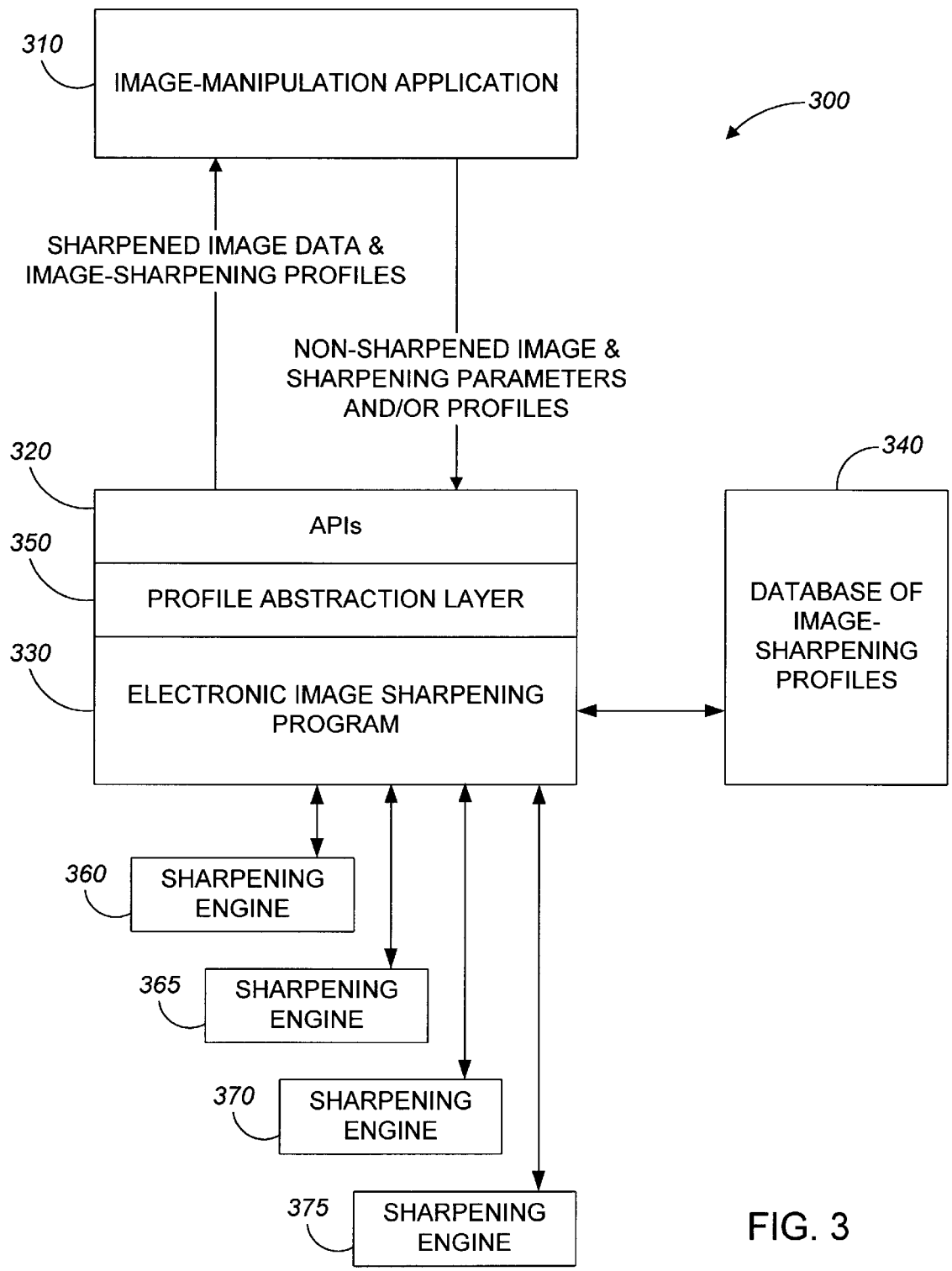
FIG. 3 is a block diagram illustrating a system for managing image-sharpening profiles.

FIG. 3 is a block diagram illustrating the elements of an image-sharpening profile management system. The elements can reside on a server that is coupled to the Internet and to a local network of other computers. The elements include one or more image-manipulation application programs 310 that a user can execute to view, edit, or create an electronic image. The elements further include an image-sharpening program 330 for creating, editing, and associating image-sharpening profiles; a collection 340 of image-sharpening profiles, which may be organized as a library or a database that is in one location or distributed over multiple locations; a collection of sharpening engines 360–375 for sharpening images; and a sharpening system abstraction layer 350 and associated application program interfaces 320 to allow applications software to access the sharpening system through the abstraction layer for purposes of building lists of available image-sharpening profiles and sharpening engines, passing image data with pointers to profiles, and receiving sharpened image data back from the selected sharpening system once the image-sharpening profile has been applied and the image data sharpened. A sharpening profile can optionally include data identifying a preference for one or more particular sharpening engines, to guide a system in selecting an engine when multiple engines are available.

The invention can be implemented in digital electronic circuitry, or in computer hardware, firmware, software, or in combinations of them. The apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications can be made without departing from the spirit and scope of the invention. For example, steps of the invention can be performed in a different order and still achieve desirable results.

An image-sharpening profile need not be in XML format; it can be a text file, a binary file, or have a custom format. An image-sharpening profile can include default values for sharpening parameters and information about the sharpening engine used to establish its sharpening parameters.

A tag used to associate an image-sharpening profile to an image can be text unique to the profile or an index. The name can optionally be fully qualified and involve implicit file structure. Alternatively, an image-sharpening profile can associate by storing, in the file containing the electronic image, a resource fork that points to an image-sharpening profile.

A sharpening engine can be a stand-alone program available on a user's computer or it can be a Web applet or servlet. A sharpening engine that uses image-sharpening profiles can also be implemented in a device driver or output device such as a printer to which image files and associated profiles are sent to be printed or displayed.

A sharpening engine and a default image-sharpening profile can reside on an EPROM of an input device such as a digital camera. The default profile may be modified or replaced with other profiles.

A driver for an output device can have a program that modifies the parameters sent from the image-sharpening profile to the sharpening engine. The program thus compensates for systematic output flaws specific to the output device.

In the method of selecting a profile from a collection of generic image-sharpening profiles, instead of adjusting the sharpening parameters of a selected generic profile, a user could duplicate the generic profile and modify its parameters, creating a custom copy.

In selecting a feature for creating image-sharpening profiles, a user may select a feature for sharpening an image instead of one for only creating profiles. In the former case, after determining the preferred sharpening parameters from the sample image the user saves these parameters to an image-sharpening profile from the unsharp masking dialog rather than applying the sharpening parameters to the sample image.

Accordingly, other embodiments are within the scope of the following claims.

What is claimed is:

1. A method for specifying an image processing operation, comprising:

creating an image-sharpening profile, the image-sharpening profile comprising digital data encoding sharpening parameters, the sharpening parameters being control parameters for guiding the operation of an image sharpening engine to provide a desired sharpening of an electronic image, wherein the image-sharpening profile is designed for a particular resolution, rendering device, or subject matter;

associating the image-sharpening profile with a specific electronic image and at least one other electronic image; and storing the image-sharpening profile as a separate file external to any electronic image.

2. The method of claims 1, further comprising providing the profile and associated image to an image sharpening engine, whereby the sharpening engine sharpens the electronic image according to the image-sharpening profile.

3. The method of claims 2, wherein creating an image-sharpening profile further comprises setting the sharpening parameters according to user input.

4. The method of claim 1, wherein associating the image-sharpening profile comprises appending data to the electronic image, the data identifying the profile.

5. The method of claim 4, wherein the data further indicates whether the electronic image has been sharpened, whereby a sharpening engine can avoid sharpening an already sharpened electronic image.

6. A method for specifying an image processing operation, comprising:

creating an image-sharpening profile, the image-sharpening profile comprising digital data encoding sharpening parameters, the sharpening parameters being control parameters for guiding the operation of multiple image sharpening engines to provide a desired sharpening of an electronic image; and storing the image-sharpening profile as a separate file external to any electronic image.

7. The method of claim 6, further comprising providing the profile and associated image to an image sharpening engine, whereby the sharpening engine sharpens the electronic image according to the image-sharpening profile.

8. The method of claim 7, wherein creating an image-sharpening profile further comprises setting the sharpening parameters according to user input.

9. The method of claim 6, wherein the image-sharpening profile is designed for a particular resolution, rendering device, or subject matter, the method further comprising associating the image-sharpening profile with at least one other electronic image.

10. The method of claim 9, wherein associating the image-sharpening profile comprises appending data to the electronic image, the data identifying the profile.

11. The method of claim 10, wherein the data further indicates whether the electronic image has been sharpened, whereby a sharpening engine can avoid sharpening an already sharpened electronic image.

12. A system, comprising:

a collection of image-sharpening profiles, each image-sharpening profile comprising digital data encoding sharpening parameters, the sharpening parameters being control parameters for guiding the operation of an image sharpening engine to provide a desired sharpening of an electronic image, the collection including generic sharpening profiles designed to specify sharpening for different resolutions, different rendering devices, and different subject matters in an electronic image, and means for selecting an image-sharpening profile from the collection and associating the selected profile with an electronic image.

13. The system of claim 12, wherein the collection includes a generic image-sharpening profile for sharpening images dominated by flesh tones, a generic image-sharpening profile for sharpening images of products, and a generic image-sharpening profile for sharpening a combination of flesh tones and products.

14. The system of claim 12, further comprising a means for a user to change the sharpening parameters of the selected image-sharpening profile.

15. The system of claim 12, further comprising a sharpening engine operable to sharpen an image according to a selected image-sharpening profile.

16. The system of claim 15, wherein the collection resides on an Internet server accessible for download.

17. The system of claim 16, wherein associating an image-sharpening profile with an electronic image comprises appending data to the electronic image, the data identifying the profile.

18. The system of claim 17, wherein the data further indicates whether the electronic image has been sharpened, whereby a sharpening engine can avoid sharpening an already sharpened electronic image.

19. A method of processing image data, comprising:

receiving an electronic image;

obtaining an image-sharpening profile associated with the electronic image and at least one other electronic image, the profile being separate from and external to the electronic image, the profile comprising sharpening parameters, the sharpening parameters being control parameters for guiding the operation of an image sharpening engine to provide a desired sharpening for an electronic image, wherein the image-sharpening profile is designed for a particular resolution, rendering device, or subject matter; and providing the electronic image and the profile to a sharpening engine to sharpen the electronic image according to the image-sharpening profile.

20. The method of claim 19, wherein the sharpening engine is part of an image manipulation application.

21. The method of claim 19, wherein the sharpening engine is a stand-alone application.

22. The method of claim 19, wherein the sharpening engine resides in a driver of an output device or in an output device.

23. The method of claim 19, wherein the sharpening engine resides in a driver of an input device or in an input device.

24. The method of claim 19, further comprising changing the sharpening parameters according to user input.

25. The method of claim 24, wherein the image-sharpening profile is associated with at least one other electronic image.

26. The method of claim 25, further comprising appending data to the electronic image, the meta-data identifying the profile.

27. The method of claim 26, wherein the data indicates whether the electronic image has been sharpened and the indication operates to prevent a sharpening of an already sharpened electronic image.

28. A computer program product, tangibly stored on a computer-readable medium, for specifying an image processing operation, comprising instructions operable to cause a programmable processor to:

create an image-sharpening profile, the image-sharpening profile comprising digital data encoding sharpening parameters, the sharpening parameters being control parameters for guiding the operation of multiple image sharpening engines to provide a desired sharpening of an electronic image; and store the image-sharpening profile as a separate file external to any electronic image.

29. The product of claim 28, further comprising instructions to:

provide the profile and associated image to an image sharpening engine, whereby the sharpening engine sharpens the electronic image according to the image-sharpening profile.

30. The product of claim 29, wherein the instructions to create an image-sharpening profile further comprise instructions to:

set the sharpening parameters according to user input.

31. The product of claim 28, wherein the image-sharpening profile is designed for a particular resolution, rendering device, or subject matter, the product further comprising instructions to:

associate the image-sharpening profile with at least one other electronic image.

32. The product of claim 31, wherein the instructions to associate the image-sharpening profile further comprise instructions to:

append data to the electronic image, the data identifying the profile.

33. The product of claim 32, wherein the data further indicates whether the electronic image has been sharpened, whereby a sharpening engine can avoid sharpening an already sharpened electronic image.

* * * * *

UNITED STATES PATENT AND TRADEMARK OFFICE
CERTIFICATE OF CORRECTION

PATENT NO. : 6,788,824 B1
DATED : September 7, 2004
INVENTOR(S) : Louis T. Prestia It is certified that error appears in the above-identified patent and that said Letters Patent is hereby corrected as shown below:

<u>Column 6,</u>
Lines 47 and 51, delete "claims" and replace with -- claim --.

Signed and Sealed this

Eighth Day of February, 2005

JON W. DUDAS
*Director of the United States Patent and Trademark Office*